United States Patent [19]

Effenberger et al.

[11] Patent Number: 4,921,505

[45] Date of Patent: May 1, 1990

[54] PROCESS FOR THE PREPARATION OF NEW CRYSTAL MODIFICATION OF AN AZO DYESTUFF

[75] Inventors: Gunther Effenberger, Bad Vilbel; Hubert Kruse, Kelkheim, both of Fed. Rep. of Germany

[73] Assignee: Cassella Aktiengesellschaft, Frankfurt, Fed. Rep. of Germany

[21] Appl. No.: 283,470

[22] Filed: Dec. 12, 1988

[30] Foreign Application Priority Data

Dec. 21, 1987 [DE] Fed. Rep. of Germany ....... 3743349

[51] Int. Cl.⁵ .................... C09B 29/20; C09B 67/10; D06P 1/18
[52] U.S. Cl. ........................... 8/526; 8/662; 8/695; 8/922; 8/924; 534/575
[58] Field of Search .............................................. 8/526

[56] References Cited

U.S. PATENT DOCUMENTS

| | | | |
|---|---|---|---|
| 2,007,382 | 7/1935 | Ockman et al. | 8/526 |
| 4,074,965 | 2/1978 | Kruse et al. | 8/662 |
| 4,319,880 | 3/1982 | Opitz et al. | 8/526 |
| 4,327,999 | 5/1982 | Koller et al. | 8/526 |
| 4,329,144 | 5/1982 | Eugster et al. | 8/526 |
| 4,332,588 | 7/1982 | Eugster et al. | 8/526 |
| 4,374,640 | 2/1983 | Tappe et al. | 8/526 |
| 4,460,375 | 7/1984 | Sommer et al. | 8/526 |
| 4,722,737 | 2/1988 | Brandt et al. | 8/526 |

*Primary Examiner*—A. Lionel Clingman
*Attorney, Agent, or Firm*—Connolly and Hutz

[57] ABSTRACT

In the process for the preparation of the dyestuff of the formula I

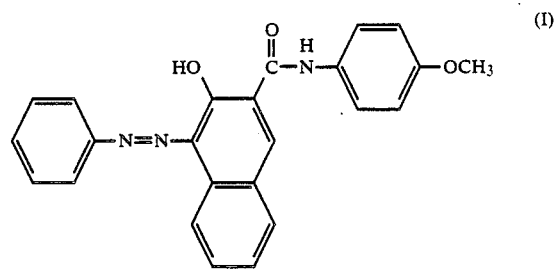

by diazotization and coupling, the aqueous suspension present when the coupling has ended is heated to temperatures of 50° C. up to the boiling point of the aqueous phase in the presence of a dispersing agent.

12 Claims, 2 Drawing Sheets

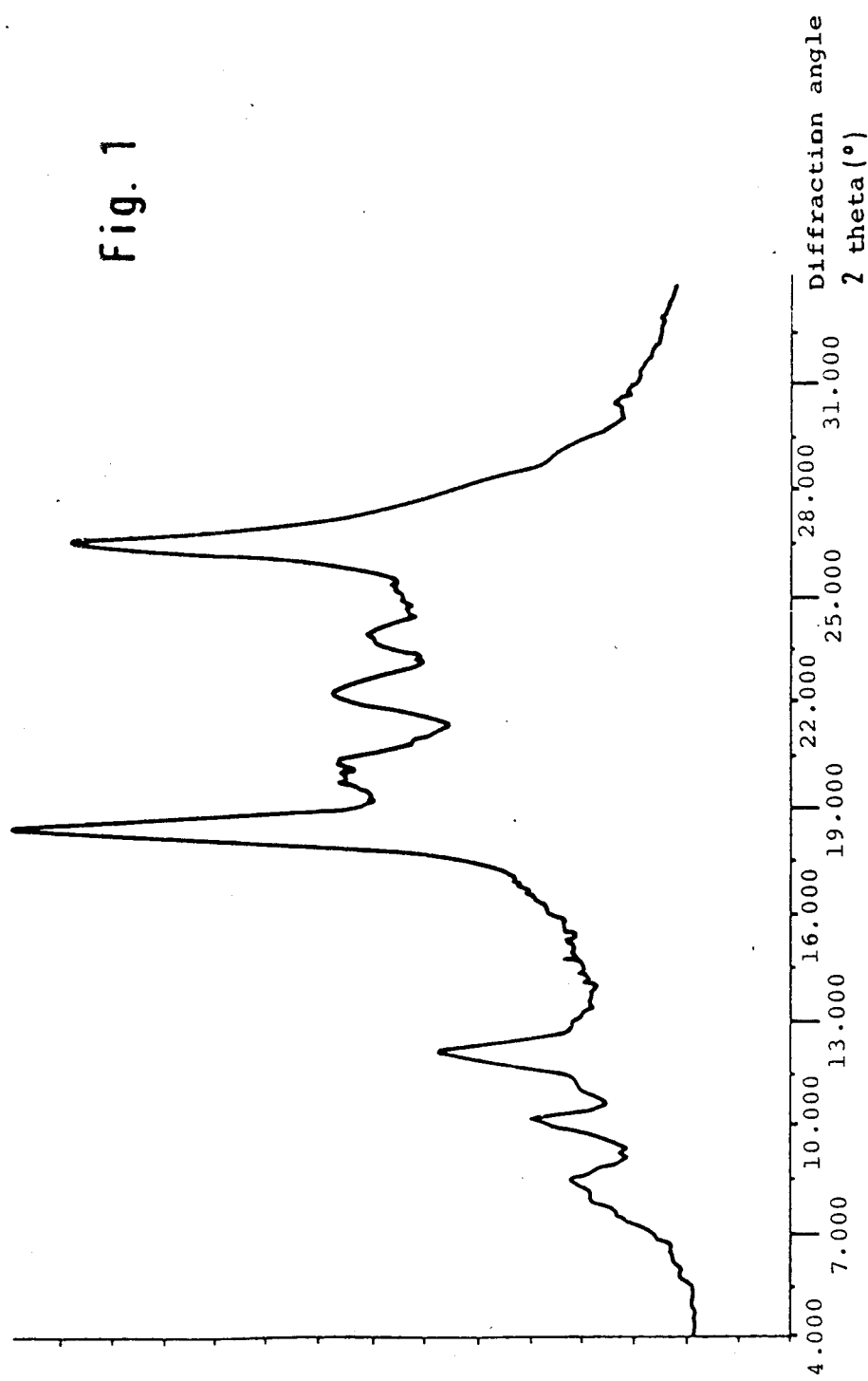

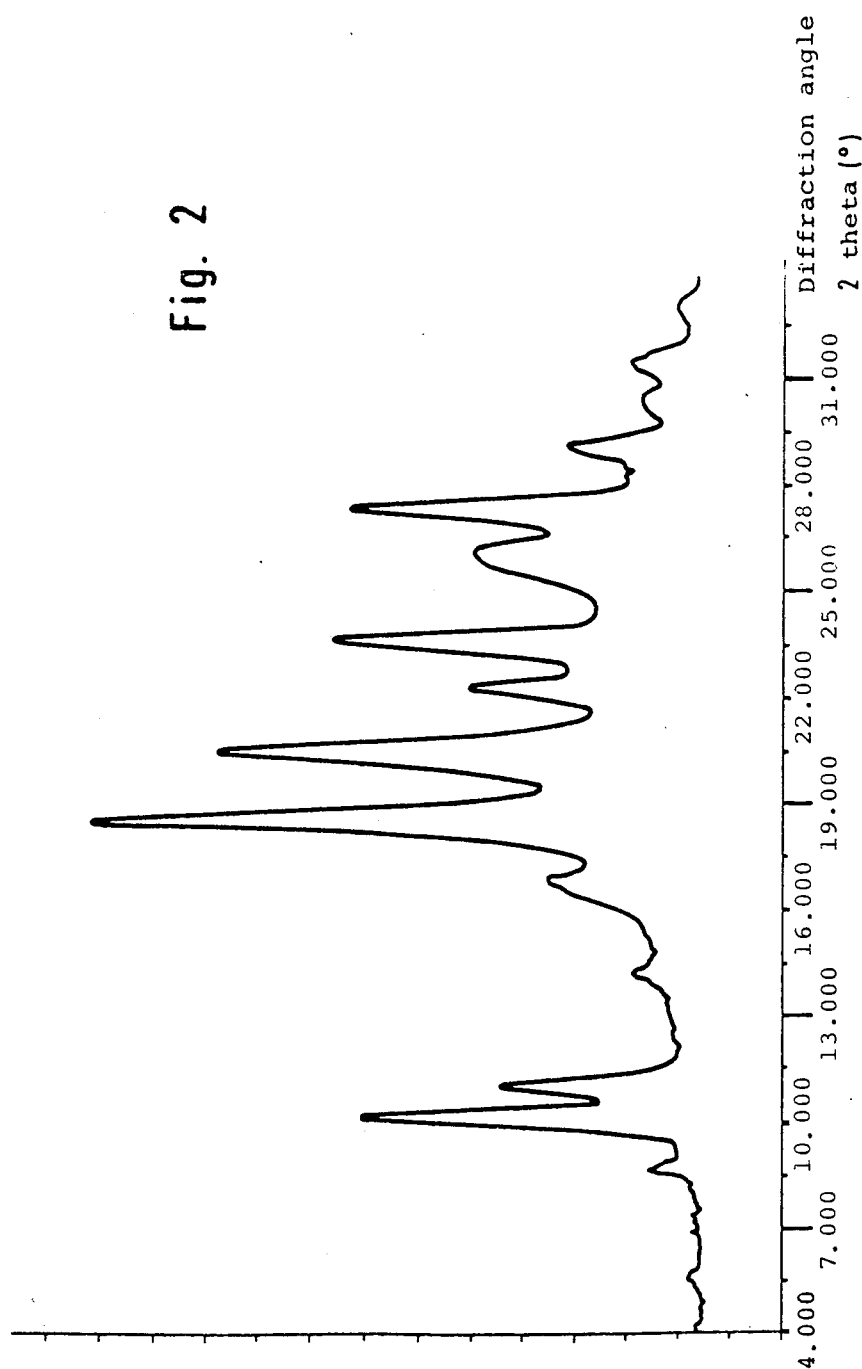

PROCESS FOR THE PREPARATION OF NEW CRYSTAL MODIFICATION OF AN AZO DYESTUFF

The invention relates to a process for the preparation of the azo dyestuff of the formula I

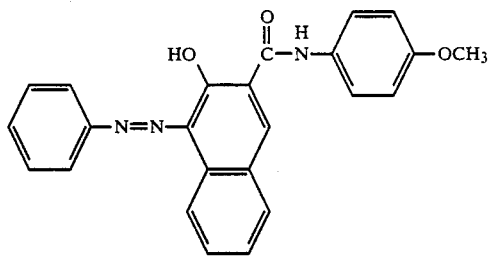

The invention furthermore relates to the dyestuff of the formula I in the β-modification, a process for the preparation of the dyestuff of the formula I in the β-modification from the dyestuff of the formula I in the α-modification and the use of the dyestuff of the formula I in the β-modification for dyeing and printing shaped structures, such as fibres, woven fabrics and films of synthetic and semi-synthetic materials, and furthermore dye preparations containing the dyestuff of the formula I in the β-modification.

The dyestuff of the formula I is used in the form of aqueous dispersions of the hitherto known α-crystal modification for dyeing and printing shaped structures of linear aromatic polyesters or of polyamides, compare DBP 1,131,639. The dyestuff gives fast red-orange dyeings and prints by these processes.

The dyestuff of the formula I is prepared by coupling diazotized aniline to N-(p-methoxyphenyl)-3-hydroxynaphthalene-2-carboxamide. When the coupling has ended, the dyestuff which has precipitated is isolated by filtration and as a rule washed neutral and free from salts with water. This gives the dyestuff in the form of an aqueous paste. Disadvantages here are that the paste is filtered only poorly and the isolated paste contains the dyestuff in amounts of only less than 20% by weight.

The dyestuff of the formula I can be prepared in a considerably higher paste content, for example of more than 60% by weight, by the process according to the invention.

The invention thus relates to a process for the preparation of the dyestuff of the formula I by coupling diazotized aniline to N-(p-methoxyphenyl)-3-hydroxynaphthalene-2-carboxamide in an aqueous phase and then isolating the dyestuff. The process according to the invention is characterized in that the aqueous suspension present when the coupling has ended is heated to temperatures of 50° C. up to the boiling point of the aqueous phase, preferably 50° to 95° C., in the presence of a dispersing agent. The dyestuff is then isolated in a manner which is known per se, that is to say, for example, filtered off. The dyestuff can be isolated from the hot suspension or after cooling the suspension to low temperatures, for example to room temperature. The dyestuff is advantageously isolated from the hot suspension. The filtration is carried out on filtering devices which are known per se, and in industrial practice usually on filter presses. Apart from in special cases, the isolated dyestuff is still washed neutral and free from salts, which can be done, for example, directly on the filtering device. An aqueous paste is then present, which contains the dyestuff of the formula I in an amount of more than 60% by weight and can be used in the customary manner for the preparation of dye preparations or for isolation of the dry dyestuff.

In the process according to the invention, the diazotization and coupling are carried out in a manner which is known per se. Thus, for example, the aniline is diazotized in strongly acid aqueous solution by the action of a diazotizing agent. Aqueous phosphoric acid, sulphuric acid or in particular hydrochloric acid are used, for example, for the strongly acid aqueous solution. Diazotizing agents are, for example, salts of nitrous acid, in particular the alkali metal salts, such as, for example, sodium nitrite, or substances which form nitrous acid, such as, for example, nitrosylsulphuric acid.

In the diazotization, the aniline is usually taken in the aqueous mineral acid and the diazotizing agent is metered in. The diazotization is usually carried out at temperatures from −20° to +15° C., preferably −10° to +10° C.

The coupling component N-(p-methoxyphenyl)-3-hydroxy- naphthalene-2-carboxamide is dissolved in water in the presence of a base, such as, for example, an alkali metal hydroxide or alkaline earth metal hydroxide.

For carrying out the coupling, the diazonium salt solution is allowed to run into the coupling solution, while stirring, in a manner which is known per se the coupling temperature being kept in the range from, for example, −15° to +40°, preferably 0° to 30° C., by indirect or direct cooling, for example with ice. The mixture is then stirred until the coupling has ended.

When the coupling has ended, according to the invention the aqueous dyestuff suspension present is heated to temperatures of 50° C. up to the boiling point of the aqueous phase. The heating can be carried out under normal pressure or under increased pressure If the heating is carried out under increased pressure, temperatures of, for example, up to 140° C. are reached. As a rule, however, heating under increased pressure is not necessary. The suspension is preferably heated to temperatures of 50° to 95° C. It is advantageously stirred during heating.

It has been found that the crystal modification of the dyestuff changes on heating and the new β-modification is formed from the α-modification originally present. The formation of the new β-modification of the dyestuff I has usually ended after a heating time of ¼ hour to 10 hours, preferably ½ hour to 2 hours. The precise heating time can be determined microscopically or by X-ray on samples of dyestuff removed. The suspension is heated until the conversion into the β-modification has taken place, in particular until this conversion has ended.

The new β-modification of the dyestuff of the formula I has an X-ray diffraction diagram (Cu-Kα-radiation) with the following lines at the diffraction angles 2 theta (°):

| | |
|---|---|
| lines of high intensity: | 18.34; 26.46; |
| lines of moderate intensity: | 12.02; 20.29; 22.26; 23.94; |
| lines of low intensity: | 7.35; 7.92; 8.42; 10.08; 11.10; 27.93; 28.11; 28.89; 29.34. |

The X-ray diffraction diagram of the β-modification of the dyestuff I recorded with Cu-Kα-radiation is shown in FIG. 1. A D 501 counting tube diffractometer from Siemens was used to record the X-ray diffraction diagram.

The hitherto known α-modification of the dyestuff of the formula I has the X-ray diffraction diagram (Cu-Kα-radiation) shown in FIG. 2, having the following lines at the diffraction angles 2 theta (°):

| | |
|---|---|
| lines of high intensity: | 18.48; 20.47; |
| lines of moderate intensity: | 10.15; 23.58; 27.26; |
| lines of low intensity: | 8.76; 11.03; 14.21; 16.76; 22.26; 25.86; 29.07; 30.35; 31.44; 32.97. |

The aqueous dyestuff suspension is heated according to the invention in the presence of a dispersing agent. The dispersing agent can thereby advantageously already be present during the coupling, for example it can be taken together with the coupling component. Suitable dispersing agents are, in particular, synthetic products with surface-active properties which can be cationic or preferably non-ionic or anionic in character. It is also possible to use mixtures of two or more different dispersing agents, thus, for example, of non-ionic and anionic dispersing agents.

Suitable anionic dispersing agents are, for example: the condensation products of an aromatic sulphonic acid with formaldehyde, ligninsulphonates having an average molecular weight of between 1,000 and 80,000, sulphite cellulose waste liquor, dialkylsulphosuccinates having in each case 3 to 10 C atoms in the alkyl groups, sulphated or sulphonated fatty acids or fatty acid esters having 10 to 22 C atoms in the fatty acid radical, longer-chain alkyl- and alkylarylsulphonates, such as, for example, dodecylbenzenesulphonate, sec.-alkanesulphonates, diisopropyl- or diisobutylnaphthalenesulphonate or dinaphthylmethanesulphonate. These anionic surface-active substances are usually in the form of salts with alkali metals, in particular sodium or ammonium, or amines, such as morpholine, triethanolamine, ethanolamine or isopropanolamine, or with 2- or 3-valent cations, such as, for example, calcium, magnesium or aluminium.

Suitable cationic surface-active dispersing agents are, for example: quaternary alkylammonium halides having at least one $C_{12}$ to $C_{25}$ alkyl radical and long-chain quaternary compounds of pyridine, morpholine and imidazoline, for example laurylpyridinium chloride.

Suitable non-ionic surface-active dispersing agents are, for example: ethylene oxide adducts and propylene oxide adducts, for example with saturated and/or unsaturated fatty alcohols having 6 to 20 C atoms or alkylphenols having 4 to 12 C atoms in the alkyl radical, water or saturated and/or unsaturated fatty amines having 14 to 20 C atoms or saturated and/or unsaturated fatty acids having 14 to 20 C atoms; and furthermore: graft polymers of ethylene oxide and polypropylene glycol, and mixed esters of o-phosphoric acid with polyglycols (molecular weight between 200 and 2,000) and saturated or unsaturated longer-chain fatty alcohols which are oxyethylated with 1 to 4 units of ethylene oxide, such as, for example, the esters of o-phosphoric acid, polyglycol (molecular weight 300) and the reaction product of one mol of ethylene oxide and one mol of lauryl alcohol.

The dispersing agent or dispersing agent mixture is used, for example, in an amount of 0.2 to 30% by weight, in particular 0.5 to 10% by weight, based on the amount of dyestuff present after coupling.

It is advantageous for the pH of the aqueous suspension to be brought to 7 to 10, preferably 8 to 9, before the heating. This adjustment of the pH can be effected by addition of an acid, in particular a mineral acid, such as phosphoric acid, sulphuric acid or in particular hydrochloric acid.

In the process according to the invention, not only is a considerable increase in the paste content achieved, but at the same time the time for isolation of the paste by filtration is also shortened considerably, and in particular as a rule by a factor of about 3. The space/time yield of the preparation process is in this way also considerably improved.

It has furthermore been found that the β-modification of the dyestuff of the formula I obtained in the process according to the invention is superior to the hitherto known α-modification in the dyeing of shaped structures of synthetic or semi-synthetic materials, in particular in levelness and fastness to rubbing.

For example, if polyester fibre materials are dyed from an aqueous bath at elevated temperature using a dispersion containing the dyestuff of the formula I in the α-modification, uneven dyeings with poor fastnesses to rubbing are as a rule obtained. Such dyeings arise, for example, in all cases where the dye liquor is exhausted only slowly or where such a large excess of dyestuff is used that, for example, exhaustion of the dye bath never occurs in dyeing in circulating liquor machines for loose material, for rovings, such as slubbings, or yarns with a package system or in the dyeing of wound packages. The disadvantages mentioned are to be attributed here to a change in the physical state of the dyestuff which occurs during the dyeing operation and progresses adversely.

Surprisingly, in contrast, the dyestuff I in the new β-modification according to the invention behaves considerably more advantageously in the dyeing of synthetic and semi-synthetic fibre materials. Under the conditions customary for dyeing with disperse dyestuffs, that is to say in an aqueous medium at temperatures of about 140° C., if appropriate in the presence of customary dyeing auxiliaries, preferably at temperatures of 100° to about 140° C. under pressure, or at the boiling point of water in the presence of carriers, such as, for example, phenylphenols, polychlorobenzene compounds or similar auxiliaries, the dyestuff I in the β-modification no longer changes its crystal structure, and the crystal geometry, such as the crystal size, changes only to the extent that the dyeing properties are not adversely influenced. Dispersions of the dyestuff I in the β-modification are thus stable during dyeing, it being possible to use the dyestuff by itself or as mixtures with other disperse dyestuffs. For example, uniform dyeings of high fastness to rubbing can be achieved with a dispersion of the dyestuff I in the β-modification according to the invention on polyester fibre material from an aqueous bath at 130° C. under pressure. In particular, deposit-free dyeings of wound packages of polyester fibre material are obtained with dispersions of the dyestuff I in the β-modification by dyeing in a circulating liquor machine.

The β-modification of the dyestuff I is therefore outstandingly suitable for dyeing and printing shaped structures, such as fibres, woven fabrics and films, of synthetic and semi-synthetic materials by processes which are known per se for dyeing and printing with disperse dyestuffs.

The term "synthetic and semi-synthetic materials" is to be understood here as meaning, for example, materials of cellulose di-, 2.½- or triacetate and fibre materials of polyamides, such as poly-ε-caprolactam or polyhexamethylenediamine adipate, or of polyurethanes, polyolefines or polycarbonates, but in particular fibre materials of polyesters, such as polyethylene glycol terephthalate fibres.

For dyeing and printing, the β-modification of the dyestuff I is converted into a very fine division in a manner which is known per se.

It has furthermore been found that an already existing α-modification of the dyestuff I can be converted into the β-modification by heating to temperatures of 50° C. up to the boiling point of the aqueous phase, if appropriate under pressure, preferably under normal pressure at 50° to 95° C., in an aqueous medium in the presence of a dispersing agent, preferably while stirring.

Heating is carried out until the α-modification has been converted into the β-modification, which as a rule takes ¼ hour to 10 hours, preferably ½ hour to 2 hours. The conversion can be monitored by X-ray or microscopically on samples removed.

Dispersing agents which can be used are the dispersing agents already mentioned, individually or in combination with one another. 1 to 500% by weight, preferably 5 to 400% by weight, of dispersing agent, based on the α-modification to be converted, is usually employed.

The heating can be carried out in various ways. Thus, for example, a paste which has been washed neutral and free from salts and contains the dyestuff of the formula I in the α-modification can be heated in an aqueous medium with addition of the dispersing agent, preferably while stirring. However, the heating can also be carried out, for example, in the course of customary conversion of the dyestuff into a very fine division. The α-modification is in this case converted into a finely disperse form in the wet state on customary devices, such as, for example, mills or kneaders, with the addition of one or more dispersing agents and, if appropriate, other customary additives (such as, for example, dustproofing agents, antifreeze agents, wetting agents, agents which prevent drying out and the like). Suitable mills are, for example, ball, vibratory, bead and sand mills. If the conversion of the dyestuff into a finely disperse form is carried out at the temperatures mentioned, preferably 50° to 95° C., conversion of the α-modification of the dyestuff of the formula I, which is unstable during dyeing, into the β-modification of the dyestuff of the formula I, which is stable during dyeing, also takes place.

Preparation of the β-modification of the dyestuff I in the course of the dyestuff preparation described above by diazotization and coupling and by heating the suspension obtained during the coupling is preferred.

If the β-modification of the dyestuff of the formula I, which is stable during dyeing, has not been prepared by heating in the course of the conversion into a very fine division and therefore is not already in a very fine division, for use for dyeing or for the preparation of dye preparations it is converted into a very fine division in the abovementioned manner which is known per se. The customary additives, such as, for example, dustproofing agents, antifreeze agents, wetting agents, agents which prevent drying out, agents which improve the flow properties and the like, are added, if appropriate, in a manner which is known per se during preparation of dye preparations.

During the fine division, the dyestuff particles are comminuted mechanically until an optimum specific surface area is achieved and sedimentation of the dyestuff particles in a liquid dyestuff formulation or in the dye bath is as low as possible. The size of the dyestuff particles when the fine division has ended is generally about 0.1 to 10 μm.

The β-modification of the dyestuff I surprisingly also has a decidedly better grinding paste stability in the finely divided dispersions than the previously known α-modification of the dyestuff I. The undesirable and troublesome foam formation which occurs during preparation of finely divided dispersions of the α-modification is also virtually completely suppressed in the preparation of the finely divided dispersions of the α-modification.

Drying which is known per se is then also carried out for the preparation of pulverulent dye preparations.

The β-modification according to the invention is of further importance in that fine divisions of the dyestuff I in this crystal structure also meet the requirements of dyeing technology if coloured goods of so-called industrial quality are used as starting substances for the preparation of the fine division instead of goods which have previously been subjected to purification operations. These industrial goods, such as are present as a moist paste after filtration from the coupling broth and after washing neutral with water or are present as a dry powder after drying differ from the goods which are purified expensively and/or with much effort, and at any rate by additional operations, such as recrystallization or washing out with organic solvents, in that they can contain varying amounts of by-products or also impurities. These by-products or impurities originate from precursors used in industrial quality for preparation of the dyestuff or have formed during preparation of the dyestuff itself.

In the following examples, parts denote parts by weight.

EXAMPLE 1:

(a) 23.3 parts of aniline are dissolved in 300 parts of water and 80 parts of hydrochloric acid, and 45 parts of a 40% strength by weight sodium nitrite solution are then added for the diazotization at −5° to +5° C., while stirring. When the reaction has ended, the diazonium salt solution is allowed to run into a solution of 82 parts of N-(p-methoxyphenyl)-3-hydroxynaphthalene-2-carboxamide and 2.5 parts of a modified lignin-sulphonate in 1,000 parts of water and 110 parts of 27% strength by weight sodium hydroxide solution at 5° to 20° C. in the course of 30 minutes. The mixture is subsequently stirred at 5° to 20° C. for 1 hour, brought to pH 8 to 9 with concentrated hydrochloric acid and heated at 70° C. and the reaction mixture is kept at this temperature for 1 hour, while stirring. Thereafter, the dyestuff is filtered off hot with suction, for which 3 minutes are required, washed neutral and free from salts with water and isolated as a paste. This paste contains the dyestuff in the β-modification and has a dry content of 69% by weight.

(b) 30 parts by weight of the dyestuff paste obtained according to (a) are ground in the wet state at 20° C. with the addition of 60 parts by weight of an anionic dispersing agent based on a condensation product of naphthalenesulphonic acid and formaldehyde, until 90% of the particles are equal to or smaller than 1 μm in size. After the ground material has been dried, a pulverulent formulation of the dyestuff which outstandingly meets all the technological requirements is obtained.

COMPARISON EXAMPLE (Preparation of the dyestuff in the hitherto known α-modification)

23.3 parts of aniline are dissolved in 300 parts of water and 80 parts of hydrochloric acid, and 45 parts of a 40% strength by weight sodium nitrite solution are then added for the diazotization at −5° to +5° C., while stirring. When the reaction has ended, the diazonium salt solution is allowed to run into a solution of 82 parts of N-(p-methoxyphenyl)-3-hydroxynaphthalen-2-carboxamide in 1,000 parts of water and 110 parts of 27% strength by weight sodium hydroxide solution at 5° to 20° C. in the course of 30 minutes. The mixture is subsequently stirred at 5° to 20° C. for 1 hour. Thereafter, the dyestuff is filtered off with suction, which takes 9 minutes, washed neutral and free from salts with water and isolated as a paste. This paste contains the dyestuff I in the α-modification and has a dry content of 19% by weight.

EXAMPLE 2

100 parts of a paste which contains the dyestuff I in an amount of 19% by weight in the α-modification (this paste is prepared by the above comparison example) are ground in the wet state in a bead mill at 80° C. with the addition of 60 parts by weight of an anionic dispersing agent based on a condensation product of naphthalenesulphonic acid and formaldehyde, until 90% of the particles are equal to or less than 1 μm in size and also complete conversion of the crystal structure into the β-modification is observed. After drying, a pulverulent formulation of the dyestuff of the formula I in the β-modification, which is stable during dyeing, is obtained, the formulation outstandingly meeting all the technological requirements.

EXAMPLE 3

5 g of polyethylene terephthalate fibres in the form of a knitted fabric are dyed for 1 hour at 130° C. in a bath which contains 1 per cent by weight of the finely dispersed dyestuff of the formula I in the β-modification in 200 ml of water. In the customary manner, the resulting orange dyeing is after-treated by reduction, rinsed hot and cold and dried. The dyeing obtained has a better levelness and better fastness to rubbing than a dyeing produced in the same manner with the α-modification of the dyestuff I.

EXAMPLE 4

25 g of polyethylene terephthalate woven fabric are printed with a printing paste containing 50 g of the dyestuff I in the β-modification, 200 g of nafka gum, 50 g of naphthol diglycol ether and 700 g of water per kilogram. After drying, the dyeing is fixed at 200° C. for 30 seconds and then after-treated by reduction. An orange-coloured print of good fastness properties, in particular good fastness to rubbing, is obtained.

EXAMPLE 5

5 g of a woven fabric of polymeric ε-caprolactam are dyed in a liquor ratio of 1 : 40 in a bath containing 2 per cent by weight of the finely dispersed dyestuff of the formula I in the β-modification. Dyeing is carried out at 100° C. for 1 hour and the fabric is then rinsed at 60° C. The dyeing thus obtained has, in particular, a better levelness and better fastness to rubbing than a dyeing produced in the same way using the α-modification of the dyestuff I.

We claim:

1. Process for the preparation of the β-modification of the dyestuff of the formula I

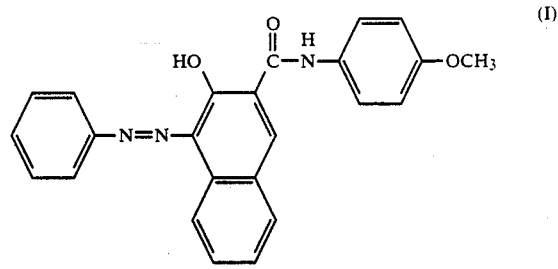

by coupling diazotized aniline to N-(p-methoxyphenyl)-3-hydroxyhthalene-2-carboxamide in an aqueous phase and then isolating the dyestuff, characterized in that the suspension present when the coupling has ended is heated to temperatures of 50° C. up to the boiling point of the aqueous phase in the presence of a dispersing agent for 0.25 to 10 hours or of several dispersing agents.

2. Process according to claim 1, characterized in that heating is carried out for 0.25 to 10 hour until the dyestuff is converted into the new crystal modification which forms on heating has taken place.

3. Process according to claim 1, characterized in that the suspension is heated to temperatures of 50° to 95° C.

4. Process according to claim 1, characterized in that a pH of 7 to 10, is established before the heating.

5. Process according to claim 1, characterized in that the suspension is stirred during the heating.

6. Process according to claim 1, characterized in that heating is carried out for 0.5 to 2 hour until conversion of the dyestuff into the β-modification of the dyestuff having the X-ray diffraction diagram (Cu-Kα-radiation) with the following lines at the diffraction angles 2theta (°):

| | |
|---|---|
| lines of high intensity: | 18.34; 26.46; |
| lines of moderate intensity: | 12.02; 20.29; 22.26; 23.94; |
| lines of low intensity: | 7.35; 7.92; 8.42; 10.08; |
| | 11.10; 27.93; 28.11; 28.89; |
| | 29.34; | has taken place.

7. Process according to claim 1, characterized in that the heating is carried out for 0.5 to 2 hours.

8. Process according to claim 1, characterized in that a pH of 8 to 9 is established before the heating.

9. A process for dyeing or printing synthetic or semi-synthetic fiber materials by application of the dyestuff produced by the process of claim 1.

10. β-Modification of the dyestuff of the formula I

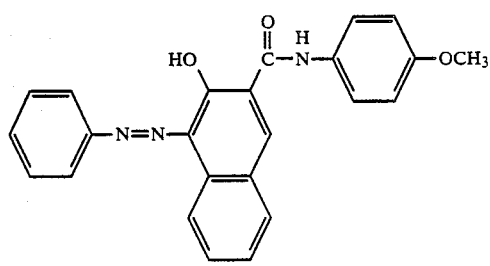

having the X-ray diffraction diagram (Cu-Kα-radiation) with the following lines at the diffraction angles 2 theta (°):

| lines of high intensity: | 18.34; 26.46; |
| --- | --- |
| lines of moderate intensity: | 12.02; 20.29; 22.26; 23.94; |
| lines of low intensity: | 7.35; 7.92; 8.42; 10.08; 11.10; 27.93; 28.11; 28.89; 29.34. |

11. Process for the preparation of the β-modification of the dyestuff of the formula I described in claim 7, characterized in that the dyestuff of the formula I present in the α-modification is heated to temperatures of 50° C. up to the boiling point of the aqueous phase in an aqueous medium in the presence of a dispersing agent or several dispersing agents until the conversion into the β-modification has taken place.

12. A process for dying or printing synthetic or semi-synthetic fiber materials by application of the dyestuff of claim 10.

* * * * *